F. LEVIN.
DEVICE FOR SLITTING SCREW HEADS.
APPLICATION FILED JULY 17, 1911.
1,035,612.
Patented Aug. 13, 1912.
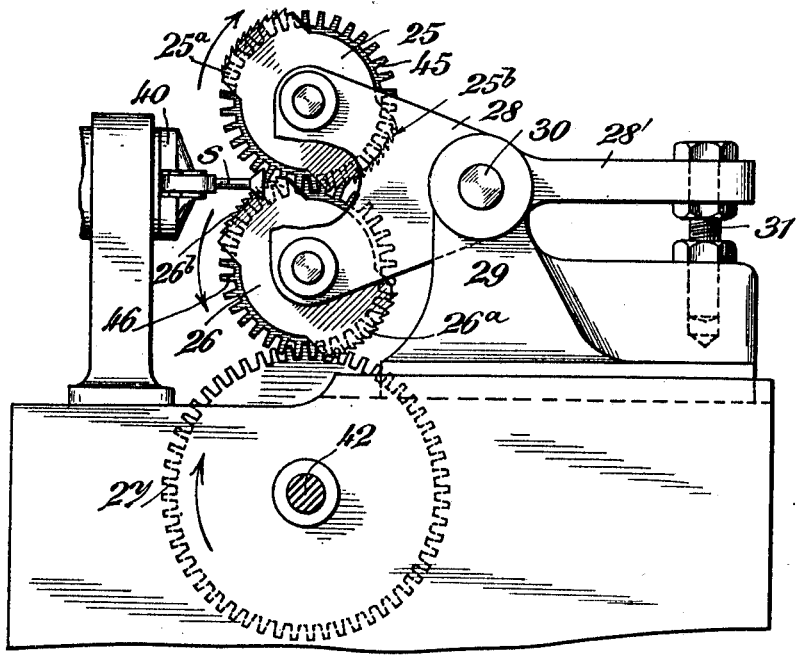
Witnesses:
B. Dommers
E. Leckert.
Inventor:
Frédéric Levin,
By Henry Ort Jr.
atty.

UNITED STATES PATENT OFFICE.

FRÉDÉRIC LEVIN, OF RORSCHACH, SWITZERLAND.

DEVICE FOR SLITTING SCREW-HEADS.

1,035,612.    Specification of Letters Patent.    Patented Aug. 13, 1912.

Application filed July 17, 1911. Serial No. 638,915.

*To all whom it may concern:*

Be it known that I, FRÉDÉRIC LEVIN, a citizen of the Republic of France, residing at Simonstrasse 7, Rorschach, Switzerland, have invented new and useful Improvements in Devices for Slitting Screw-Heads; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a device for producing slits in screw heads in which the bottom of the slit in the center is higher than on both ends, so that a screw-driver provided with a corresponding notch is prevented from sliding when acting on the screw.

This machine has two rotary saw blades carried by a slide, which blades are positively connected with one another and provided with toothed segments, by means of which, on the movement of the slide against the screw, they alternately cut from one side and the other into the screw head.

In the accompanying drawing a form of construction of the device is shown in elevation.

Two saw blades 25 and 26 are arranged in the same vertical plane. Each of the saw blades is provided on its periphery with diametrically located toothed projections 25ᵃ, 25ᵇ, 26ᵃ, 26ᵇ and notches between them. The saw blades 25 and 26 are connected to each other by toothed wheels 45 and 46, motion being imparted to the wheel 46 from a main shaft 42 by a toothed wheel 27. Both the saw blades are carried by a support 28, which is adjustably mounted on an axle 30 of a horizontally movable slide 29. The position of the support 28 may be adjusted by means of an arm 28′ fixed to the support, and a screw 31. By turning the screw 31 the height of the saw blades 25, 26 is adjusted in such a way that the slot in the head of the screw *s* is cut symmetrically with its center.

If both the saw blades 25 and 26 are rotated and the slide moved to and fro toward the head of the screw *s* the head is alternately slit by the two saw blades. During this operation the cutting part of one saw blade always projects into a notch between the two toothed projections of the other blade, which is then out of action.

What I claim is:

1. In a device for slitting screws, two saw blades, means for rotating the saw blades, two toothed projections provided on each of said blades, a slide carrying said saw blades, means positively connecting the saw blades to each other and means for moving said slide to and fro against the screw, substantially as described.

2. In a device for slitting screws, two saw blades, means for rotating the saw blades, two toothed projections provided on each of said saw blades, a slide carrying said saw blades, toothed wheels positively connecting the saw blades to each other and means for moving said slide to and fro against the screw, substantially as described.

3. In a device for slitting screws, two saw blades, means for rotating the saw blades, two toothed projections provided on each of said saw blades, a slide, a support pivotally connected to said slide and carrying said saw blades, toothed wheels positively connecting the saw blades to each other and means for moving said slide to and fro against the screws, substantially as described.

4. In a device for slitting screws, two saw blades, means for rotating the saw blades, two toothed projections provided on each of said blades, a slide, a support pivotally connected to said slide carrying said saw blades, means for adjusting the support, toothed wheels positively connecting the saw blades to each other and means for moving said slide to and fro against the screw, substantially as described.

5. In a device for slitting screws, two saw blades, means for rotating the saw blades, two toothed projections provided on each of said saw blades, a slide, a support pivotally connected to said slide and carrying said saw blades, means for adjusting the support, toothed wheels positively connecting the saw blades to each other, means for moving said slide to and fro against the screw and means for holding the screw fixedly in position during cutting substantially as described.

In testimony that I claim the foregoing as my invention, I have signed my name in presence of two subscribing witnesses.

FRÉDÉRIC LEVIN.

Witnesses:
   HENRY HERMANN,
   ALBERT PHILLIPS.